UNITED STATES PATENT OFFICE.

RICHARD ZSIGMONDY, OF GOTTINGEN, AND WILHELM BACHMANN, OF HANOVER, GERMANY.

FILTER AND METHOD OF PRODUCING SAME.

1,421,341. Specification of Letters Patent. Patented June 27, 1922.

No Drawing. Application filed July 23, 1919. Serial No. 312,878.

*To all whom it may concern:*

Be it known that we, RICHARD ZSIGMONDY, of 47 Friedländerweg, in the city of Gottingen, Prussia, Germany, and WILHELM BACHMANN, of 17 Fundstrasse, in the city of Hanover, Prussia, Germany, have invented certain new and useful Improvements in Filters and Methods for Producing Same (for which I have filed applications in Germany Aug. 28 and Dec. 4, 1917; in Austria Oct. 5, 1917; in Switzerland Oct. 19, 1917; in Belgium Oct. 31, 1917; in Sweden Nov. 1, 1917; in Holland Nov. 19, 1917; in Hungary Oct. 23, 1917; in France Dec. 17, 1917, and in Italy Jan. 2, 1918), of which the following is a specification.

Our invention refers to the art of filtering and more especially to filters for separating minute particles such as bacteria or colloidal substances from the medium in which they are suspended. The particular object of our invention is a filtering material of superior qualities adapted to retain particles of ultra microscopic dimensions.

The filtering of bacteria or substances of a colloidal character with a view to separating them from the medium in which they are suspended has been effected up to this time by aid of quite a number of different materials and devices, all of which, however, were lacking perfection inasmuch as the materials in question were either brought upon the market in a condition unfit for technical use or did not offer any guaranty against the passing through of finely divided particles such as bacteria and the like.

As is well known in the art, the separation of colloids from crystalloids and the purification of certain colloidal solutions can be effected for instance by dialysis through parchment-, bladder- or collodium diaphragms, this method being, however, connected with the drawback of requiring a high dilution of the preparations to be subjected to dialysis. The so-called ultra-filters, although rendering good services in a number of cases in scientific researches, could not yet be employed on a commercial scale for the reason that their production and use is rather unsafe and their filtering capacity too small.

It has further been tried to use filters consisting of inorganic substances and presenting a large internal surface, such filters being adapted to retain for a short time bacteria or colloidal substances by mere adsorptive action. As soon, however, as their internal surface has reached a state of adsorptive saturation or the germs are permitted to grow through the filtering material, their efficacy is greatly reduced. Such methods are therefore unfit for use on a greater scale, the colloidal matter obstructing after a short time the mechanically formed large pores by depositing therein in great masses, thus ultimately putting an end to filtration altogether. In such a case a passage for the liquid to be filtered can be restored only by burning the filter out.

Besides the filters acting by adsorption there have been used strainer filters having pores of a diameter less than the linear diameter of the particles to be filtered. To this class of filters belong the ultra-filters mentioned above, the gelatinous ultra-filters, which are moreover very sensitive against all mechanical stresses, become impermeable on drying and have a very reduced capacity. Some of these drawbacks have been remedied for instance by disposing the filtering layers on porous supports in order to render them less vulnerable, or by adding to the collodium solutions from which they are prepared, hygroscopic substances such as glycerine or honey or castor oil, such additions serving for preventing the filters from drying and getting impermeable.

In contradistinction to the filtering substances mentioned above the filters according to the present invention are diaphragms or membranes having a very high filtering capacity and being free of the imperfections described. The said filters consist substantially of cellulose esters which are substances resulting from the action of acids on cellulose, the best known of these substances being nitric acid ester or the so-called nitrocellulose which is obtained by treating cellulose with a mixture of nitric and sulphuric acids. Acetyl cellulose or cellulose acetate is another ester which results from the action of acetic anhydride or acetyl chloride on cellulose and cellulose derivatives in the presence of a catalyst. Such esters are subjected to a treatment, equalling a mechanical treatment, with certain solvent mixtures which together with a moist atmosphere imparts to them a structure rendering them particularly suitable for filtering purposes. The solvent mixtures used may be simple, double or multiple mixtures volatile at ordinary temperature and on evaporating in a moist atmosphere relinquishing the cellulose esters under the form of opake membranes of a strong parchment-like structure rendering all supporting substance unnecessary, the said membranes permanently keeping their permeability after drying although not containing any hygroscopic or others additions, and presenting a very high filtering capacity.

As solvent mixtures suitable for use in preparing the membranes forming the primary object of the present invention we prefer using mixtures of acetone, chloroform or acetic ether with glacial acetic acid, alkohols or ethers or such other liquids as will dissolve the cellulose esters together with acetone, chloroform or acetic ether.

In practicing our invention it is further possible to predetermine and to vary within wide limits the diameter of the pores and the permeability of the membranes by varying either the percentage of cellulose esters in solution or the composition of the solvent mixture or the quantity of moisture in the air or the quantity of water previously added to the solution.

The variation of the quantity of moisture in the air filling the space within which the solvents are evaporated, or of the quantity of water previously added to the solutions of the cellulose esters offer a particularly efficient means for influencing at will the diameter of the pores and the permeability of the filters to be produced. Thus for instance denser filters are obtained in an atmosphere having a lower degree of moisture, while a higher percentage of moisture in the air will result in an increased permeability of the filters.

In order to manufacture filters in accordance with the present invention the solvents are expelled from the cellulose ester solution spread out on suitable supports in air or any other atmosphere containing a predetermined quantity of moisture, said atmosphere being preferably agitated, the solvents being advantageously regenerated by causing the air loaded with solvent vapors to pass through a system of absorbers, whereupon it is again moistened and returned to the evaporation room in order to be used afresh in the evaporation process, the air being thus caused to circulate in a closed circle. In order to obtain uniform results the temperature as well as the quantity of moisture in the air should be kept as constant as possible. The relative degree of moisture is obtained preferably by aid of wet shawls or by aid of a spray of water or steam; or else it is prepared by drying it with calcium chloride or the like. We prefer however to cause the air to pass first through or over watery solutions of a predetermined steam tension and thereafter over the cellulose ether solution, circulating of the air in a closed circle offering in this case as well the greatest guaranties for keeping constant the temperature and the degree of moisture.

Example: 10 parts, by weight, of dried nitrocellulose are dissolved in 80 parts of acetone and 37 parts of glacial acetic acid. A suitable portion of the solution thus obtained is poured on glass plates and, after equally distributing the viscous solution in a horizontal position, it is allowed to dry, partly or totally, in an atmosphere of about 60 per cent of relative moisture at a temperature of about 18 degrees C., the membranes resulting from this treatment being placed in water and washed. In this manner large or small, thick or thin films can be produced.

The films or disks thus obtained are sometimes corrugated and can be obtained in a smooth form only by storing them under water. Moreover they cannot be made to closely adhere to smooth surfaces without forming plaits, and they cannot be used therefor where a drum-shaped strainer shall be tightly covered with such membranes in order to be evacuated. In order to obtain the membranes in a perfectly smooth condition we place them, while they are still wet, in a stretcher and heat them either in hot water or in steam. Contrary to what one would expect, the filters thus treated are dried without in the least changing their form.

For filtering purposes on a small scale such as in a laboratory we prefer placing such membranes on a porous or perforated support whose back surface is subjected to the action of a vacuum, such as a vacuum funnel disposed on an exhauster.

We may further place the filters in an air-tight manner upon the porous or perforated walls of a vessel, drum or the like connected to a vacuum pump, the said vessel or drum being then immersed in the liquid to be filtered and the filtrate passing through the membranes and the porous or perforated walls of the vessel or drum into the interior.

Vessels, drum or chambers of the kind described may be combined to form systems of any desired capacity, pressure reservoirs or pump being connected to such chambers if necessary. The filters according to this invention may further be used with advantage in filter presses suitably adapted for their use.

In order to be able to filter in a continuous manner we prefer using a double system of chambers, the one half being cleaned while in the other half the filtration is carried on.

Our filters may further be used for freeing gases and fumes from particles freely distributed therein. All kinds of slime and ultra microscopic particles of one ten thousandth millimeter and less are retained by said filters without obstructing their pores. The filters can easily be freed from any slime, which may adhere to them, for instance by aid of a soft brush and water, there being no danger of the membranes being damaged by this treatment.

We claim:

1. The method of making filters which consists in dissolving a cellulose ester in solvent mixtures and evaporating the solution in a moist atmosphere.

2. The method of making filters which consists in dissolving a cellulose ester in solvent mixtures and evaporating the solution in an atmosphere containing a predetermined percentage of moisture.

3. The method of making filters which consists in dissolving a cellulose ester in solvent mixtures containing a predetermined amount of water and evaporating the solution so as to obtain a dry film.

4. The method of making filters which consists in dissolving a cellulose ester in solvent mixtures containing a predetermined amount of water and evaporating the solution in a moist atmosphere.

5. The method of making filters which consists in dissolving a cellulose ester in solvent mixtures containing a predetermined amount of water and evaporating the solution in an atmosphere containing a predetermined percentage of moisture.

6. The method of making filters which consists in dissolving a cellulose ester in solvent mixtures and evaporating the solution in an atmosphere containing a predetermined percentage of moisture and keeping said percentage of moisture and the temperature substantially constant.

7. In the method of making filters by causing a solution of cellulose ester in suitable solvents to evaporate in a moist atmosphere, the step of freeing the air from the solvent vapors, moistening it afresh and returning it to the evaporation chamber.

8. The method of making filters which consists in dissolving a cellulose ester in a solvent mixture volatile at ordinary temperature, spreading said solution on a suitable support and freeing it from said solvents whereby a dry film of cellulose ester is formed.

9. The method of making filters which consists in dissolving a celluose ester in a solvent mixture volatile at ordinary temperature, spreading said solution on a suitable support and evaporating said solution whereby a dry film of cellulose ester is formed.

10. The method of making filters which consists in dissolving a cellulose ester in a solvent mixture volatile at ordinary temperature, spreading said solution on a suitable support and evaporating said solution in a moist atmosphere whereby a dry film of cellulose ester is formed.

11. The method of making filters which consists in dissolving a cellulose ester in a solvent mixture volatile at ordinary temperature, spreading said solution on a suitable support and evaporating said solution in an atmosphere containing a predetermined percentage of moisture whereby a dry film of cellulose ester is formed.

12. The method of making filters which consists in dissolving a cellulose ester in solvent mixtures at ordinary temperature, adding water, spreading said solution on a suitable support and evaporating said solution in a moist temperature whereby a dry film of cellulose ester is formed.

13. The method of making filters which consists in dissolving nitrocellulose in acetone and glacial acetic acid, spreading said solution on a suitable support, causing said solution to dry in a moist atmosphere and washing the film obtained.

14. The method of making filters which consists in dissolving nitrocellulose in acetone and glacial acetic acid, adding water, spreading said solution on a suitable support, causing said solution to dry in a moist atmosphere and washing the film obtained.

15. The method of making filters which consists in dissolving cellulose ester in a mixture of suitable solvents evaporating the solvents and heating the product being formed while it is wet.

16. The method of making filters which consists in dissolving cellulose ester in a mixture of suitable solvents evaporating the solvents and stretching and heating the product being formed while it is wet.

17. The method of making filters which consists in dissolving cellulose ester in a mixture of suitable solvents spreading the solution on a suitable support, evaporating the solvents and heating the product being formed while it is wet.

18. The method of making filters which consists in dissolving cellulose ester in a mixture of suitable solvents, spreading the solution on a suitable support, evaporating the solvents and stretching and heating the product being formed while it is wet.

19. As a new article of manufacture, a filtering medium consisting of cellulose ester and produced by dissolving a cellulose ester in solvent mixtures and evaporating the solution in a moist atmosphere.

20. As a new article of manufacture, a filtering medium consisting of nitrocellulose and produced by dissolving nitrocellulose in solvent mixtures volatile at ordinary temperature and evaporating the solution in a moist atmosphere.

21. As a new article of manufacture, a filtering medium consisting of nitrocellulose and produced by dissolving nitrocellulose in a mixture of acetone and glacial acetic acid and evaporating the solution in a moist atmosphere.

22. As a new article of manufacture, a filtering medium consisting of nitrocellulose and produced by dissolving nitrocellulose in a mixture of acetone and glacial acetic acid containing a predetermined amount of water and evaporating the solution.

23. As a new article of manufacture, a filtering medium consisting of nitrocellulose and produced by dissolving nitrocellulose in a mixture of acetone and glacial acetic acid containing a predetermined amount of water and evaporating the solution in a moist atmosphere.

24. As a new article of manufacture, a filtering medium consisting of cellulose ester and forming a solid opaque film permeable to liquids and adapted to retain bacteria and colloidal substances.

In testimony whereof we affix our signatures, in presence of two witnesses.

RICHARD ZSIGMONDY.
WILHELM BACHMANN.